(12) United States Patent
Cao et al.

(10) Patent No.: US 6,740,840 B2
(45) Date of Patent: May 25, 2004

(54) WELD ELECTRODE FOR DETECTING A MISORIENTED WELD NUT

(75) Inventors: Feng Cao, Rochester Hills, MI (US); James Norman, Clinton Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 3 days.

(21) Appl. No.: 10/161,027

(22) Filed: Jun. 3, 2002

(65) Prior Publication Data

US 2002/0179574 A1 Dec. 5, 2002

Related U.S. Application Data

(60) Provisional application No. 60/295,685, filed on Jun. 4, 2001.

(51) Int. Cl.[7] ............................................... B23K 11/30
(52) U.S. Cl. ........................................ 219/119; 219/93
(58) Field of Search ............................. 219/119, 93

(56) References Cited

U.S. PATENT DOCUMENTS

| 4,020,316 | A | | 4/1977 | Schaft |
|---|---|---|---|---|
| 4,263,831 | A | | 4/1981 | Smith |
| 4,609,805 | A | | 9/1986 | Tobita |
| 5,471,029 | A | * | 11/1995 | Simmons ..................... 219/120 |
| 5,533,850 | A | | 7/1996 | Ishihara et al. |
| 5,632,912 | A | | 5/1997 | Cecil |
| 5,705,784 | A | * | 1/1998 | Aoyama et al. ............ 219/119 |
| 5,808,266 | A | | 9/1998 | Cecil |
| 6,008,463 | A | * | 12/1999 | Aoyama et al. ............ 219/119 |
| 6,163,004 | A | * | 12/2000 | Aoyama et al. .............. 219/93 |
| 6,225,590 | B1 | | 5/2001 | Farrow |

* cited by examiner

Primary Examiner—Kiley Stoner
Assistant Examiner—Len Tran
(74) Attorney, Agent, or Firm—Edwin W. Bacon, Jr.

(57) ABSTRACT

A weld nut electrode for differentiating between a properly and an improperly oriented weld nut. The electrode has a conductive portion for passing weld current through the weld nut and an insulated portion electrically isolated from the conductive portion. The conductive portion makes electrical contact with a properly oriented weld nut, and the insulated portion is arranged to prevent physical contact between the conductive portion and an improperly oriented weld nut.

14 Claims, 2 Drawing Sheets

WELD ELECTRODE FOR DETECTING A MISORIENTED WELD NUT

CROSS-REFERENCES TO RELATED APPLICATIONS

This application claims the benefit of U.S. Provisional Application Serial No. 60/295,685, filed Jun. 4, 2001.

FIELD OF THE INVENTION

This invention relates generally to an apparatus for detecting whether a weld nut is properly oriented while being resistance welded to a workpiece.

DESCRIPTION OF THE RELATED ART

Weld nuts are often used in applications where the nut portion of a nut and bolt fastening arrangement is inaccessible after completed assembly of a production article. For example, weld nuts are often used in hollow automobile cross members to facilitate bolting to the cross member. Once the cross member is assembled, the weld nut is inside of the hollow member and is inaccessible. If the weld nut were welded upside down to the interior surface of the cross member, the entire cross member may have to be discarded or, preferably, recycled, because the weld nut is inaccessible and unserviceable.

To reduce the probability of assembling articles with upside down weld nuts, manufacturers often use a method of inspecting the weld nuts. One method of inspecting the weld nuts is to use an automated visual inspection system. This method is often expensive to put in place, and requires computer programming to accommodate parts with different appearances and profiles. Another method of inspecting the weld nuts is to employ an inspector who is assigned the task of making sure the weld nuts are properly oriented. While this method generally produces satisfactory results in the inspection process, it can be costly and subject to human error.

BRIEF SUMMARY OF THE INVENTION

Accordingly, one aspect of this invention is to provide a relatively simple and reliable method of determining whether a misoriented weld nut has been welded to a workpiece.

Another aspect of this invention is to provide a weld electrode that cooperates with a weld nut in such a way that the electrical properties of the weld event are substantially different between properly oriented and misoriented weld nuts.

Yet another aspect of this invention is to provide an inexpensive method of reliably and automatically determining whether a weld nut is properly oriented.

In accordance with these aspects, the present invention provides a weld nut electrode for differentiating between a properly and an improperly oriented weld nut. The electrode has a conductive portion for passing weld current through the weld nut and an insulated portion electrically isolated from the conductive portion. The conductive portion makes electrical contact with a properly oriented weld nut and the insulated portion makes exclusive contact with an improperly oriented weld nut. Sensing of the conductive or non-conductive condition can provide an indication as to nut orientation.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

DETAILED DESCRIPTION OF THE INVENTION

Figure 1A:
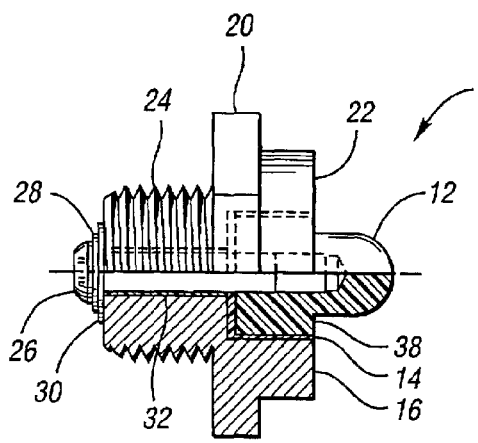
FIG. 1A is a side view of a weld electrode with a cross section of A—A in FIG. 1B.

FIG. 1A shows a partial-cutaway view of weld electrode 10. The cutaway portion is taken along section line A—A of FIG. 1B. The weld electrode 10 has a conductive body 16 with an electrode face 22. An insulated portion 12 is set in the electrode face and, as described below, is electrically insulated from the body 16. In an exemplary embodiment, the insulated portion 12 has a face 38 flush with the electrode face 22, and a pin 39 protruding from the insulated face 38. The insulated portion 12 can be made of a non-ferrous metal that can withstand the heat of resistance welding and contributes little heat via inductive heating. Non-magnetic stainless steel is a suitable material. An insulator 14 electrically isolates the body 16 from the insulated portion 12. A phenolic material may be used for the insulator 14. Alternatively, portion 12 could be formed from a nonconductive, thermal insulating material, such as a suitable ceramic material. In such an alternative embodiment, insulator 14 would not be necessary.

A screw 26 extends through an axial bore in the body 16 and secures the insulated portion 12 within the body 16. The insulated portion 12 has a threaded hole for receiving and retaining the screw 26. The screw shank is insulated from the body 16 by an insulating bushing 32 that extends the length of the axial bore in the body 16. Screw 26 can be made of non-magnetic stainless steel to prevent inductive heating and chemical, galvanic or electrical interaction with the insulated portion 12. Insulating bushing 32 can be made of a phenolic material. An insulating washer 30 electrically isolates the screw head from the body 16 and a flat washer 28 operates to keep the screw 26 secure. The foregoing description of the screw 26, washer 28, insulating washer 30, and insulating bushing 32 simply describes an arrangement for retaining the insulated portion 12 within the body 16 and is not intended to be limiting. The insulated portion may be retained with other arrangements such as by pressing it into the body 16 or securing it with an adhesive.

A portion of the outer surface of the body 16 preferably has threads 24 to facilitate securing the weld electrode 10 within a weld fixture. A hexagonal portion 20 may be incorporated to apply torque for threading the electrode 10 into the weld fixture.

Figure 1B:
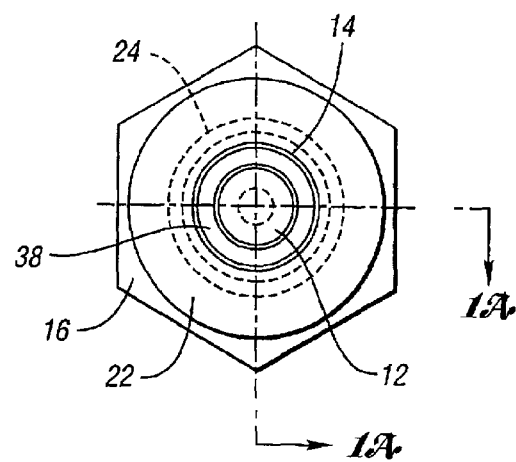
FIG. 1B is an end view of the weld electrode.

FIG. 1B shows an end view of the weld electrode looking into the electrode face 22. The insulated face 38 is located at the outer periphery of the insulated portion 12, and the electrode face 22 is located radially outward from the insulated face 38. The insulated portion 12 electrically isolated from the body 16 by the insulator 14. Insulator 14 may be omitted if the insulated portion 12 is made from a nonconductive material as discussed above. Threaded portion 24 is shown in hidden lines as its view is obscured by the electrode face 22.

Figure 2:
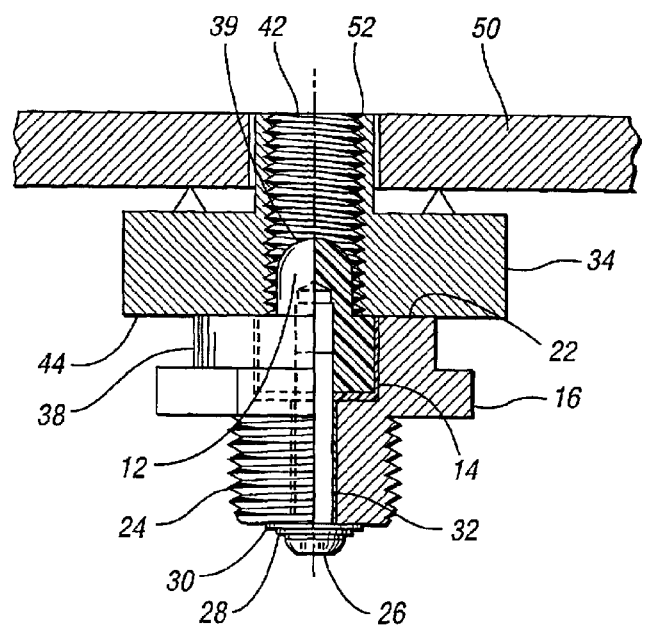
FIG. 2 is a partial cross section of the weld electrode in connection with a properly oriented weld nut for welding to a workpiece.

Turning now to FIG. 2, the weld electrode 10 is shown in a cooperating arrangement with a properly oriented weld nut 34. The insulated pin 39 extends in a direction normal to the insulated face 38 and is centered on the axial centerline of body 16. The diameter of insulated pin 39 is slightly less than the inner diameter of the mating portion of the weld nut screw hole 42. The mating of insulated pin 39 and screw hole 42 keeps the weld nut 34 aligned upon the electrode 10. The flat portion 44 of the weld nut 34 abuts the electrode face 22 and may contact the insulated face 38. The surface area in contact between the flat portion 44 and the electrode face 22 creates a low electrical resistance through which welding current can flow.

During a weld event 46 (shown in FIGS. 4 and 5), a weld voltage V is dropped across the workpiece 50 and conductive body 16. The mating area of the flat portion 44 of the weld nut 34 and the electrode face 22 has a resistance low enough to allow a weld current I to flow through the workpiece 50, weld nut 34 and electrode body 16 when the weld voltage V is applied.

Figure 3:
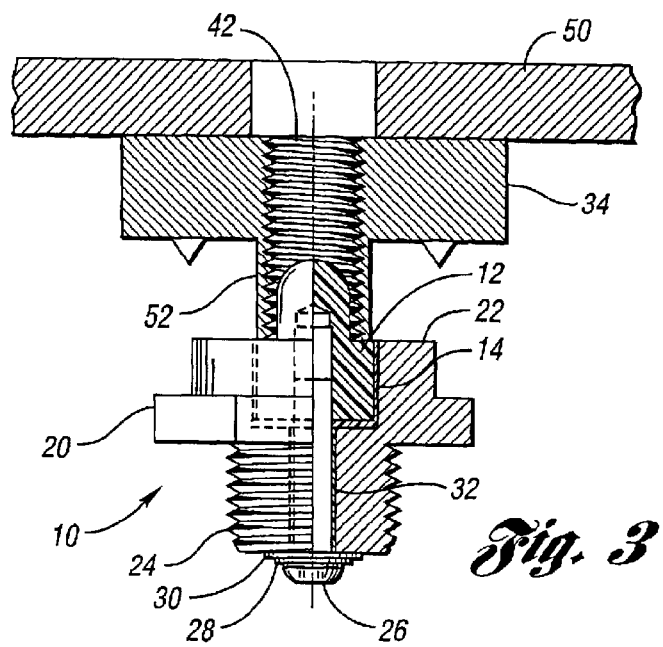
FIG. 3 is a partial cross section of a weld electrode in cooperation with a misoriented weld nut.

FIG. 3 shows weld electrode 10 mated with a misoriented weld nut 34. A weld nut pilot 52, provided on the weld nut 34, mates with the insulated pin 39 and insulated face 38. The diameter of the insulated portion 38 is greater than or equal to the outside diameter of the pilot 52, thereby preventing the weld nut 34 from making electrical contact with electrode face 22. An electrical resistance is thereby established between the workpiece 50 and conductive body 16 that is measurably higher than when the weld nut is properly oriented.

By monitoring the current or voltage, or both, during the weld event 46, the high electrical resistance may be used to facilitate detecting that the weld nut is misoriented. Because of the high resistance, the current flow I is substantially lower when the weld nut is misoriented than when it is properly oriented. In an ideal case, the current I remains at zero since the insulator 14 prevents current flow. In practice however, current I may arc from weld nut 34 to the electrode face 22, bypassing insulator 14. This arc path also has a higher resistance and lower current I than when the weld nut 34 is properly oriented. A weld system monitoring the value of weld voltage or current, or both, determines whether the weld nut is properly oriented by comparing the monitored values to predetermined values.

Figure 4:
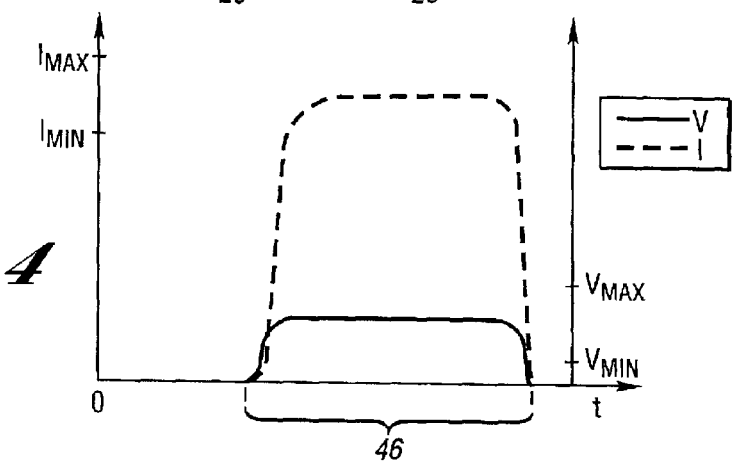
FIG. 4 shows weld current and voltage waveforms during a weld event of a properly oriented weld nut.

FIG. 4 shows an example of weld current and voltage waveforms with a properly oriented weld nut. During the weld event 46, the weld current I attains a value greater than a predetermined minimum, $I_{MIN}$, yet less than a predetermined maximum, $I_{MAX}$. In one aspect of the invention, $I_{MIN}$ is equal to 36 kiloamperes and $I_{MAX}$ is equal to 42 kiloamperes. In addition, during the weld event 46, the weld voltage attains a value between predetermined minimum $V_{MIN}$ and a predetermined maximum weld voltage $V_{MAX}$. In one aspect of the invention, these are 4.5 volts and 6.75 volts, respectively.

Figure 5:
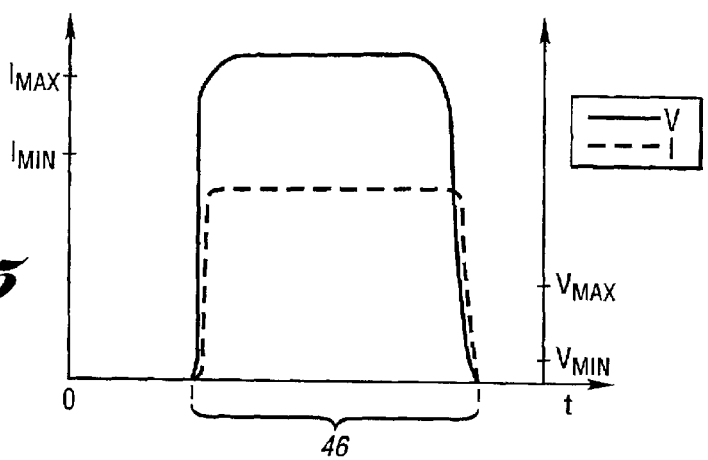
FIG. 5 shows weld current and voltage waveforms during a weld event of a misoriented weld nut.

FIG. 5 shows an example of the weld current and weld voltage when the weld nut is misoriented. The high resistance between the pilot 52 and the electrode face 22 causes the current I to be lower than with a properly oriented weld nut 34. Also, the high resistance causes the weld voltage V to be higher than when the weld nut 34 is properly oriented and the resistance between the flat portion 44 of the weld nut 34 flat and the electrode face 22 is low.

When the weld electrode 10 is used in a welding system capable of monitoring the weld current and voltage, the welding system detects a misoriented weld nut 34 by comparing the current and voltage to predetermined values. As shown in FIG. 5, a predetermined current limit $I_{MIN}$ is chosen such that it is greater than weld current $I_2$ flowing when a weld nut is misoriented and less than the weld current I flowing when the weld nut is properly oriented. Similarly, a predetermined voltage $V_{MAX}$ is chosen such that it is less than weld voltage V measured when a weld nut is misoriented, yet greater than weld voltage V measured when the weld nut is properly oriented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A weld nut electrode for differentiating between a properly and an improperly oriented weld nut, the electrode comprising:

a conductive portion for passing weld current through the weld nut, said conductive portion having an electrode face arranged to make contact with the properly oriented weld nut; and an insulated portion integral to and electrically isolated from said conductive portion, said insulated portion having a face arranged to prevent contact between said electrode face and the improperly oriented weld nut.

2. The electrode of claim 1 further comprising a guide pin projecting from said electrode, said guide pin being arranged for aligning the weld nut for contact with the electrode face and insulated face.

3. The electrode of claim 1 wherein said insulated portion is formed from non-magnetic stainless steel and further comprises an insulator between said conductive portion and said insulated portion.

4. The electrode of claim 3 wherein said insulator is formed from a phenolic material.

5. The electrode of claim 1, said conductive portion further comprising an axial bore; and said insulated portion being disposed in said axial bore.

6. The electrode of claim 5 further comprising a guide pin projecting from said electrode, said guide pin being arranged for aligning the weld nut for contact with said electrode face and said insulated face.

7. The electrode of claim 6 wherein said insulated portion is formed from non-magnetic stainless steel and further comprises an insulator between said conductive portion and said insulated portion.

8. The electrode of claim 7 wherein said insulator is formed from a phenolic material.

9. A weld nut electrode for differentiating between a properly and an improperly oriented weld nut where the weld nut has a cylindrical pilot having an inside diameter and an outside diameter, the electrode comprising:

a conductive portion for passing weld current through the weld nut, said conductive portion having a length, a proximate end, a distal end, and an axial bore of a first diameter disposed in said proximate end and extending for a fraction of said length, said first diameter being greater than the outside diameter of the weld nut pilot; and an insulated portion disposed in said axial bore of a first diameter and electrically isolated from said conductive portion, said insulated portion having a face flush with said proximate end of said conductive portion.

10. The electrode of claim 9 further comprising a guide pin arranged to mate with the inside of the cylindrical pilot, said guide pin operating to locate the weld nut to the electrode.

11. The electrode of claim 9 further comprising a screw bore of a second diameter extending from said distal end of said conductive portion though to said axial bore of a first diameter;

said insulated portion having a threaded hole aligned with said screw bore;

a screw extending through said screw bore and into said threaded hole, said screw securing said insulated portion within said conductive portion; and said screw being insulated from said conductive portion.

12. The electrode of claim 9 wherein said insulated portion is formed from non-magnetic stainless steel and further comprises an insulator between said conductive portion and said insulated portion.

13. The electrode of claim 12 wherein said insulator is formed from a phenolic material.

14. A weld nut electrode for differentiating between a properly and an improperly oriented weld nut, the electrode comprising:

a conductive portion for passing weld current through the weld nut, said conductive portion having an electrode face arranged to make contact with the properly oriented weld nut; and a non-ferrous insulated portion integral to and electrically isolated from said conductive portion; and an insulator between said conductive portion and said insulated portion, wherein said insulated portion has a face arranged to prevent contact between said electrode face and the improperly oriented weld nut.

\* \* \* \* \*